(12) United States Patent  (10) Patent No.: US 8,857,164 B2
Okami                      (45) Date of Patent:     Oct. 14, 2014

(54) EXHAUST MANIFOLD

(75) Inventor: Hirohisa Okami, Okazaki (JP)

(73) Assignee: Futaba Industrial Co., Ltd. (JP)

( * ) Notice: Subject to any disclaimer, the term of this patent is extended or adjusted under 35 U.S.C. 154(b) by 145 days.

(21) Appl. No.: 13/386,822

(22) PCT Filed: Mar. 4, 2011

(86) PCT No.: PCT/JP2011/055123
§ 371 (c)(1),
(2), (4) Date: Jan. 24, 2012

(87) PCT Pub. No.: WO2011/108723
PCT Pub. Date: Sep. 9, 2011

(65) Prior Publication Data
US 2012/0192552 A1    Aug. 2, 2012

(30) Foreign Application Priority Data

Mar. 5, 2010 (JP) .................... 2010-049283

(51) Int. Cl.
F01N 1/00    (2006.01)
F02B 27/02   (2006.01)
B21D 51/16   (2006.01)
B23P 17/00   (2006.01)
F01N 11/00   (2006.01)
F01N 13/18   (2010.01)
F01N 13/10   (2010.01)
F01N 3/10    (2006.01)

(52) U.S. Cl.
CPC .............. *F01N 13/10* (2013.01); *F01N 11/002* (2013.01); *F01N 2900/1624* (2013.01); *F01N 2560/028* (2013.01); *F01N 2560/026* (2013.01); *F01N 2900/1411* (2013.01); *F01N 13/1888* (2013.01); *F01N 13/1872* (2013.01); *F01N 2560/025* (2013.01); *F01N 2900/0601* (2013.01); *F01N 2900/1614* (2013.01); *F01N 2900/0416* (2013.01); *F01N 2900/1616* (2013.01); *F01N 2900/1606* (2013.01); *F01N 2560/021* (2013.01); *F01N 3/10* (2013.01); *F01N 2900/1402* (2013.01); *F01N 2900/1628* (2013.01); *F01N 2560/022* (2013.01)
USPC ............................ 60/323; 60/313; 29/890.08

(58) Field of Classification Search
USPC .................. 60/312, 313, 323, 324; 29/890.08
See application file for complete search history.

(56) References Cited

U.S. PATENT DOCUMENTS 6,018,946 A    2/2000  Matsumoto
2007/0119158 A1  5/2007  Yoshida et al.

FOREIGN PATENT DOCUMENTS

CN    1982664         6/2007
DE    102008018668 A1  11/2009
(Continued)

OTHER PUBLICATIONS

International Preliminary Report on Patentability dated Oct. 11, 2012 issued in PCT Patent Application No. PCT/JP2011/055123, 5 pages.

(Continued)

*Primary Examiner* — Audrey K Bradley
(74) *Attorney, Agent, or Firm* — Grossman Tucker Perreault & Pfleger PLLC

(57) ABSTRACT

An exhaust manifold to be connected to an internal combustion engine with a plurality of exhaust ports in the present invention includes a first upper shell member, a second upper shell member, and a lower shell member. The first upper shell member and the lower shell member are superposed on each other to thereby form a first flow passage to be connected to at least one exhaust port out of the plurality of exhaust ports. The second upper shell member is superposed on the lower shell member with the first upper shell member sandwiched therebetween such that at least a part of the first upper shell member is exposed, to thereby form a second flow passage to be connected to another at least one exhaust port out of the plurality of exhaust ports.

48 Claims, 7 Drawing Sheets

(56) References Cited

FOREIGN PATENT DOCUMENTS

| | | | |
|---|---|---|---|
| JP | 57140409 | 8/1982 | |
| JP | 57140509 | 8/1982 | |
| JP | 10-054234 | 2/1998 | |
| JP | 10054234 A * | 2/1998 | ............... F01N 7/00 |
| JP | 10-089064 | 4/1998 | |
| JP | 10-339223 | 12/1998 | |
| JP | 2004108210 | 4/2004 | |
| JP | 2007-154660 | 6/2007 | |

OTHER PUBLICATIONS

Japanese Office Action dated Feb. 12, 2013 issued in Japanese Patent Application No. 2010-049283, 5 pages.

Chinese Office Action dated Feb. 17, 2014, issued in Chinese Application No. 201180012564.1 with English language translation, 15 pages.

* cited by examiner

EXHAUST MANIFOLD

CROSS-REFERENCE TO RELATED APPLICATIONS

This international application claims the benefit of Japanese Patent Application No. 2010-049283 filed Mar. 5, 2010 in the Japan Patent Office, and the entire disclosure of Japanese Patent Application No. 2010-049283 is incorporated herein by reference.

FIELD OF THE INVENTION

The present invention relates to an exhaust manifold that is connected to a plurality of exhaust ports of an internal combustion engine.

BACKGROUND ART

A variety of exhaust manifolds have been known, each of which is connected to a plurality of exhaust ports of an internal combustion engine to guide exhaust gases from the respective exhaust ports to exhaust pipes on a downstream side.

For example, Patent Document 1 below discloses a proposed exhaust manifold in order to achieve both of early activation of a catalyst and improvement in output performance of an internal combustion engine. In the exhaust manifold, three sheet metal members, that is, a front half body, a partition body and a back half body, are superposed on each other. A second exhaust pipe and a third exhaust pipe communicating with a second exhaust port and a third exhaust port are formed between the front half body and the partition body. A first exhaust pipe and a fourth exhaust pipe communicating with a first exhaust port and a fourth exhaust port are formed between the partition body and the back half body.

Patent Document 2 below discloses another proposed exhaust manifold. In the exhaust manifold, an upper shell member and a lower shell member made by press molding are superposed on each other to thereby form first to fourth branch pipe parts and a collecting pipe part, and a partition plate for separating exhaust gases flowing from the first and second branch pipe parts into the collecting pipe part and exhaust gases flowing from the third and fourth pipe parts into the collecting pipe part is attached to the lower shell member. The partition plate merges a pair of the second and third branch pipe parts connected to a second exhaust port and a third exhaust port to thereby form an exhaust gas passage opening in the collecting pipe part.

PRIOR ART DOCUMENTS

Patent Documents

Patent Document 1: Japanese Unexamined Patent Application Publication No. 10-89064
Patent Document 2: Japanese Unexamined Patent Application Publication No. 2007-154660

SUMMARY OF THE INVENTION

Problems to be Solved by the Invention

In the exhaust manifold disclosed in Patent Document 1, however, it is necessary to reverse the partition body after welding the front half body and the partition body in order to weld the back half body and the partition body, which results in lower productivity.

There are other problems as follows: Since each of the first to fourth exhaust pipes is formed by the partition body and the front half body or by the partition body and the back half body, and the partition body constitutes a half side of each of the exhaust pipes, the partition body becomes larger in size. As a result, rigidity of the partition body is reduced, which is disadvantageous in terms of vibration control, and heat capacity of the exhaust manifold becomes larger to delay increase of an exhaust gas temperature, which is also disadvantageous in terms of early activation of a catalyst.

Also, the exhaust manifold disclosed in Patent Document 2 involves the following problems: When the partition plate is attached to the lower shell member, laser welding is required since the partition plate having a thin plate thickness is used, and thus large welding equipment is required. Also, since the partition plate forms a partially overlapping pipe structure, a weight becomes larger. Further, since the partition plate is welded to be superposed onto areas which are circularly concaved as the respective branch pipe parts in the lower shell member, a weld line is three-dimensional and complex, which results in lower productivity.

An object of the present invention is to provide an exhaust manifold which realizes improved productivity and high performance.

Means for Solving the Problems

An exhaust manifold according to the present invention to achieve the object is an exhaust manifold to be connected to an internal combustion engine with a plurality of exhaust ports. The exhaust manifold includes a first upper shell member, a second upper shell member, and a lower shell member. Each of the first upper shell member, the second upper shell member, and the lower shell member is formed by press molding a plate material. The first upper shell member and the lower shell member are superposed on each other, to thereby form a first flow passage to be connected to at least one exhaust port out of the plurality of exhaust ports. The second upper shell member is superposed on the lower shell member with the first upper shell member sandwiched therebetween such that at least a part of the first upper shell member is exposed, to thereby form a second flow passage to be connected to another at least one exhaust port out of the plurality of exhaust ports.

The plurality of exhaust ports may include at least four exhaust ports. The first flow passage may be connected to each exhaust port in a first group of exhaust ports, which include at least two exhaust ports having a mutually non-sequential order of exhaustion, among the at least four exhaust ports. The second flow passage may be connected to each exhaust port in a second group of exhaust ports, which include another at least two exhaust ports excluding the at least two exhaust ports included in the first group of exhaust ports and having a mutually non-sequential order of exhaustion, among the at least four exhaust ports.

The internal combustion engine may include, as the at least four exhaust ports, a first exhaust port, a second exhaust port, a third exhaust port, and a fourth exhaust port. The first exhaust port may be an exhaust port through which exhaustion is performed subsequent to the second exhaust port. The third exhaust port may be an exhaust port through which exhaustion is performed subsequent to the first exhaust port. The fourth exhaust port may be an exhaust port through which exhaustion is performed subsequent to the third exhaust port.

The second exhaust port may be an exhaust port through which exhaustion is performed subsequent to the fourth exhaust port. The first group of exhaust ports may include the second exhaust port and the third exhaust port, while the second group of exhaust ports may include the first exhaust port and the fourth exhaust port.

The first to fourth exhaust ports may be formed in an order of the first exhaust port, the second exhaust port, the third exhaust port, and the fourth exhaust port. An upstream side of the second flow passage may be formed by the lower shell member and the second upper shell member, while a downstream side of the second flow passage may be formed by the first upper shell member and the second upper shell member.

The second upper shell member and the lower shell member may be superposed on each other with the first upper shell member sandwiched therebetween, to thereby separate the first flow passage and the second flow passage. Also, the lower shell member may include a step portion corresponding to an outer periphery of the first upper shell member, and the first upper shell member may be superposed on the step portion. The step portion may be configured to be recessed toward an opposite side to a side of the lower shell member on which the first upper shell member is superposed. Further, the first upper shell member may be formed to downstream ends of the second upper shell member and the lower shell member.

Effects of the Invention

According to the exhaust manifold of the present invention, the first upper shell member is superposed on the lower shell member and the second upper shell member is further superposed thereon such that the first upper shell member is exposed. This allows welding from a same direction, and thus leads to an improved productivity.

Also, since the second upper shell member is superposed on both the lower shell member and the first upper shell member, a necessary area in the lower shell member to be attached with the second upper shell member can be reduced. Therefore, the lower shell member can be compact in size. The compact lower shell member leads to a smaller heat capacity, and thus leads to an effect that it is advantageous for early activation of a catalyst.

The configuration, in which the second upper shell member is superposed on the lower shell member with the first upper shell member sandwiched therebetween, to thereby separate the first flow passage and the second flow passage, and the configuration in which each exhaust port is connected to one of the first flow passage and the second flow passage in a non-sequential order of exhaustion may avoid interference in exhaust gases. It is advantageous to improve output performance of the internal combustion engine. Furthermore, since the flat portion of the first upper shell member can be small in size, high rigidity can be obtained, which is advantageous against vibration and enables use of a thinner wall. Thus, it is also advantageous for early activation of the catalyst.

When a step portion corresponding to an outer periphery of the first upper shell member is formed in the lower shell member, assembly can be easily performed by superposing the first upper shell member on the step portion, and thus productivity can be improved. Also, since the step portion reduces a difference in level caused by superposing the first upper shell member on the lower shell member, resistance imposed on exhaust gases passing through the second flow passage due to the difference in level can be reduced, and thus increase of pressure loss can be suppressed. Moreover, when the first upper shell member is formed to downstream ends of the second upper shell member and the lower shell member, an improved effect of suppressing interference in exhaust gases can be achieved.

EXPLANATION OF REFERENCE NUMERALS

Figure 1:
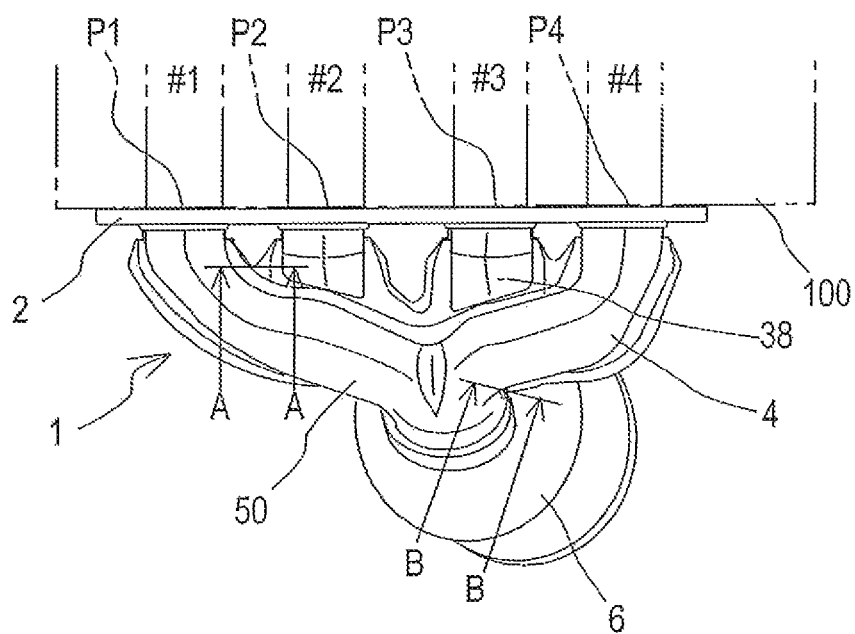
FIG. 1 is a plan view of an exhaust manifold as an embodiment of the present invention.

1 . . . exhaust manifold
2 . . . flange
4 . . . outer shell member
6 . . . converter
10-13 . . . through hole
24 . . . lower shell member
26 . . . first lower branch pipe part
27 . . . second lower branch pipe part
28 . . . third lower branch pipe part
29 . . . fourth lower branch pipe part
30 . . . lower collecting pipe part
32 . . . first flow passage
34, 36 . . . flange part
38 . . . first upper shell member
40 . . . second upper branch pipe part
41 . . . third upper branch pipe part
42 . . . flat portion
44, 46 . . . step portion
48 . . . flange part
50 . . . second upper shell member
52 . . . first upper branch pipe part
54 . . . fourth upper branch pipe part
56 . . . upper collecting pipe part
57 . . . second flow passage
58 . . . flange part
100 . . . internal combustion engine

MODE FOR CARRYING OUT THE INVENTION

Hereinafter, an embodiment for carrying out the present invention will be described in detail with reference to the drawings.

Figure 2:
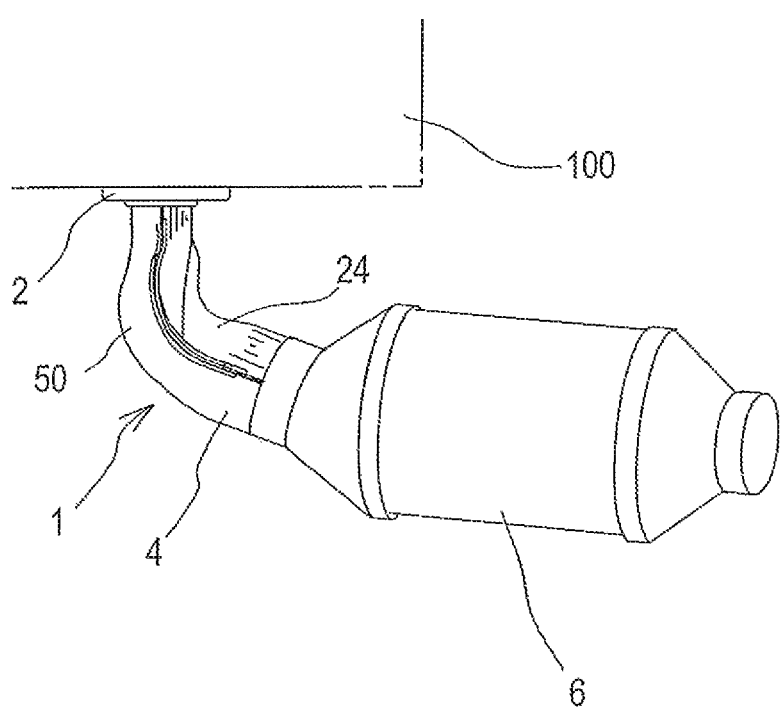
FIG. 2 is a side elevational view of the exhaust manifold according to the embodiment.

As shown in FIG. 1 and FIG. 2, an exhaust manifold 1 is used by being connected to a four-cylinder internal combustion engine 100 in the present embodiment. The internal combustion engine 100 includes first to fourth exhaust ports P1 to P4 communicating respectively with first to fourth cylinders #1 to #4, and the exhaust manifold 1 is connected to the first to fourth exhaust ports P1 to P4. In the present embodiment, ignition is performed in an order of the first cylinder #1, the third cylinder #3, the fourth cylinder #4, and the second cylinder #2, and exhaustion is performed in an order of the first exhaust port P1, the third exhaust port P3, the fourth exhaust port P4, and the second exhaust port P2.

The exhaust manifold 1 includes a flange 2 which is attached to the international combustion engine 100 and an outer shell member 4 which forms passages for exhaust gases. On an exhaustion side of the exhaust manifold 1 opposite to a connection side thereof to be connected to the first to fourth exhaust ports P1 to P4, a converter 6 is connected to the outer shell member 4. According to the exhaust manifold 1 configured as such, exhaust gases from the first to fourth exhaust ports P1 to P4 are introduced into the converter 6. The converter 6 contains a not-shown catalyst, and the exhaust gases flowing in from the exhaust manifold 1 are purified by the catalyst and then discharged toward downstream.

Figure 3:
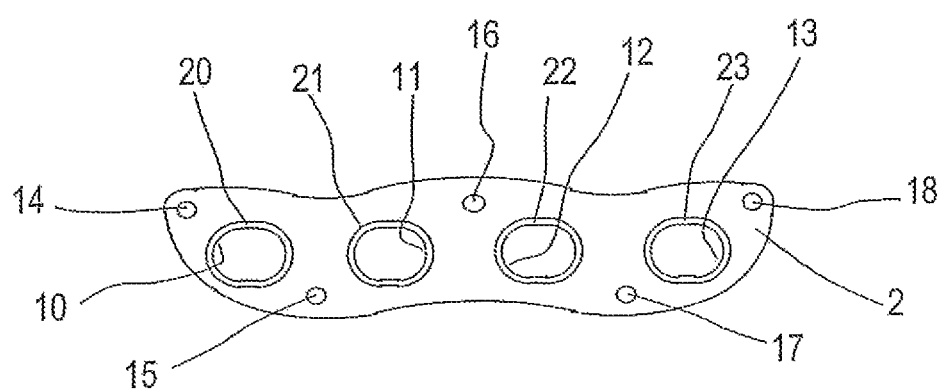
FIG. 3 is a front elevational view of a flange according to the embodiment.

As shown in FIG. 3, four through holes 10 to 13 corresponding to the first to fourth exhaust ports P1 to P4 are bored in the flange 2. The flange 2 is also provided with a plurality of attachment holes 14 to 18 for attaching the flange 2 to the internal combustion engine 100 with not-shown bolts. Annular projections 20 to 23 projecting toward the outer shell member 4 are respectively formed around the four through holes 10 to 13.

Figure 4:
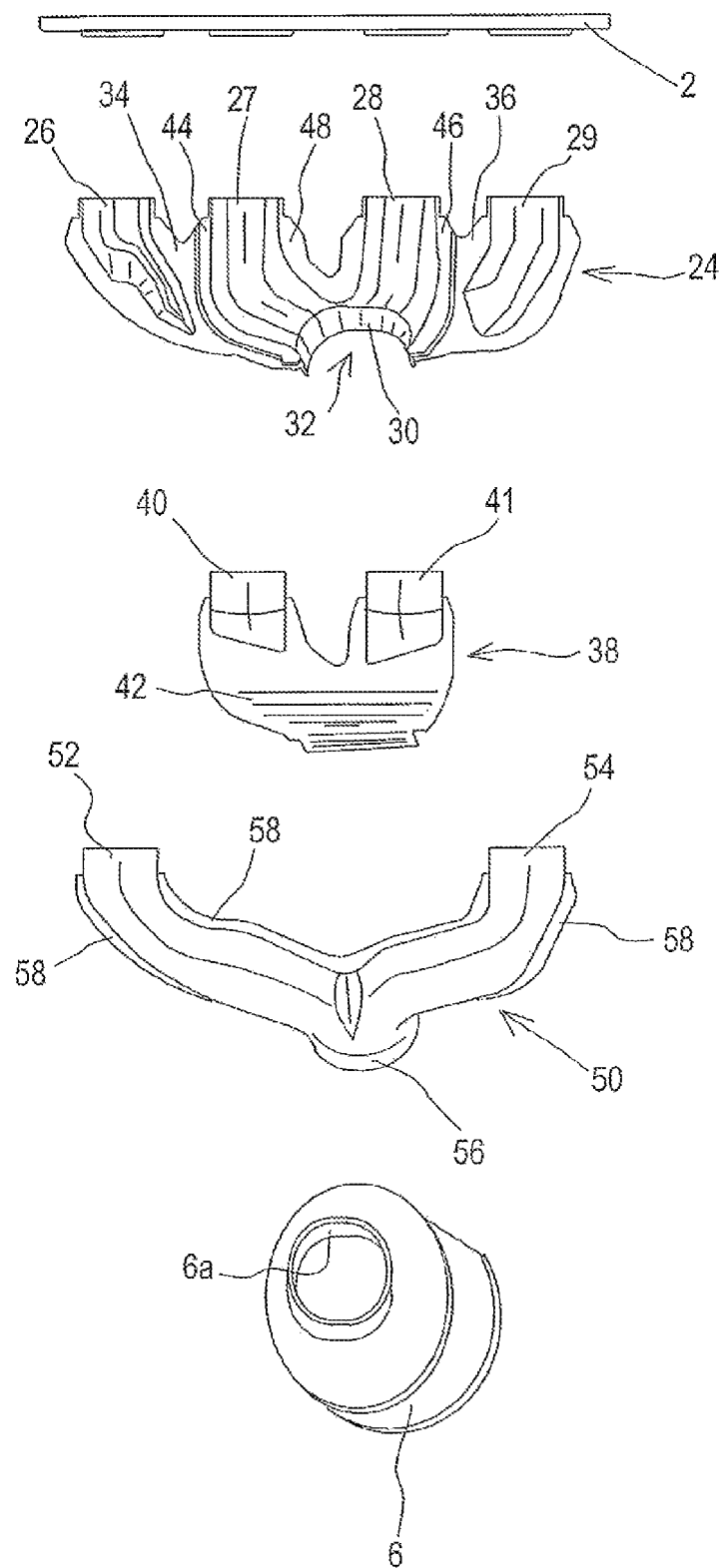
FIG. 4 is an exploded plan view of the exhaust manifold according to the embodiment.
Figure 5:
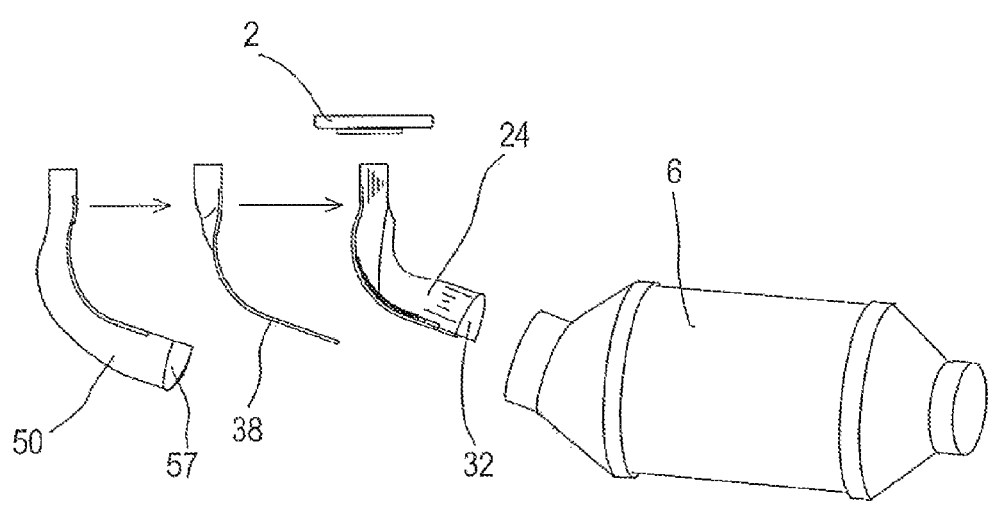
FIG. 5 is an exploded side elevational view of the exhaust manifold according to the embodiment.

As shown in FIG. 4 and FIG. 5, the outer shell member 4 includes a lower shell member 24, a first upper shell member 38, and a second upper shell member 50, each of which is formed by press-molding a plate material. The first upper shell member 38 and the second upper shell member 50 are superposed on one surface of the lower shell member 24.

The lower shell member 24, the first upper shell member 38, and the second upper shell member 50 are configured to be bent from a flange 2 side to a converter 6 side, as shown in FIG. 2.

The lower shell member 24 includes a first lower branch pipe part 26, a second lower branch pipe part 27, a third lower branch pipe part 28, and a fourth lower branch pipe part 29 formed on the flange 2 side. Each of the first to fourth lower branch pipe parts 26 to 29 is configured to be concave toward an opposite side (hereinafter, also referred to simply as a "downside" with respect to the lower shell member 24) to a side where the first upper shell member 38 and the second upper shell member 50 are superposed thereon so as to have a semicircular, semielliptical, or the like cross-section.

As shown in FIG. 4, the lower shell member 24 includes a lower collecting pipe part 30 formed on the converter 6 side. The lower collecting pipe part 30 is formed to be concave so as to have a semicircular, semielliptical, or the like cross-section.

Since the lower collecting pipe part 30 communicates with the second lower branch pipe part 27 and the third lower branch pipe part 28, planar shapes of the concaves exhibit a "Y"-shape in entirety. The second lower branch pipe part 27, a third lower branch pipe part 28, and the lower collecting pipe part 30 are covered by the first upper shell member 38 to thereby form a first flow passage 32.

Although the first lower branch pipe part 26 is configured to be concave toward the downside as described above, a flat flange part 34 without a concave portion is provided between the first lower branch pipe part 26 and the second lower branch pipe part 27, and at an outer periphery of the lower shell member 24. The first lower branch pipe part 26 is surrounded by the flange part 34 except a portion to be inserted into the through hole 10 of the flange 2.

Although the fourth lower branch pipe part 29 is also configured to be concave toward the downside in a same manner, a flat flange part 36 without a concave portion is provided between the fourth lower branch pipe part 29 and the neighboring third lower branch pipe part 28. The fourth lower branch pipe part 29 is surrounded by the flange part 36 except a portion to be inserted into the through hole 13 of the flange 2.

The first upper shell member 38 is superposed on the lower shell member 24 so as to cover an upper side of the first flow passage 32 from the second lower branch pipe part 27 and the third lower branch pipe part 28 to the lower collecting pipe part 30.

The first upper shell member 38 includes a second upper branch pipe part 40, which is formed to have a semicircular, semielliptical, or the like convex configuration toward an opposite side (hereinafter, also referred to simply as an "upside" with respect to the first upper shell member 38) to a side of the lower shell member 24, corresponding to the second lower branch pipe part 27. The first upper shell member 38 also includes a third upper branch pipe part 41, which is formed to have a semicircular, semielliptical, or the like convex configuration toward the upside, corresponding to the third lower branch pipe part 28.

When the first upper shell member 38 is superposed on the lower shell member 24, the second lower branch pipe part 27 and the second upper branch pipe part 40 fit each other, while the third lower branch pipe part 28 and the third upper branch pipe part 41 fit each other, to thereby form the first flow passage 32 thereinside.

Also, when the first upper shell member 38 is superposed on the lower shell member 24, end portions of the second lower branch pipe part 27 and the second upper branch pipe part 40 located on an opposite side to the lower collecting pipe part 30 are formed to be fittable in the through hole 11 of the flange 2, while end portions of the third lower branch pipe part 28 and the third upper branch pipe part 41 are formed to be fittable in the through hole 12 of the flange 2.

The second upper branch pipe part 40 and the third upper branch pipe part 41 are formed on a flange 2 side of the first upper shell member 38, and the first upper shell member 38 becomes substantially flat on the way from the flange 2 side to the lower collecting pipe part 30. The first upper shell member 38 has a flat portion 42 in a region from a position of becoming flat to the lower collecting pipe part 30. The flat portion 42 is curved along a shape of the lower shell member 24, but is configured to be a flat surface without a concave or convex.

Figure 6:
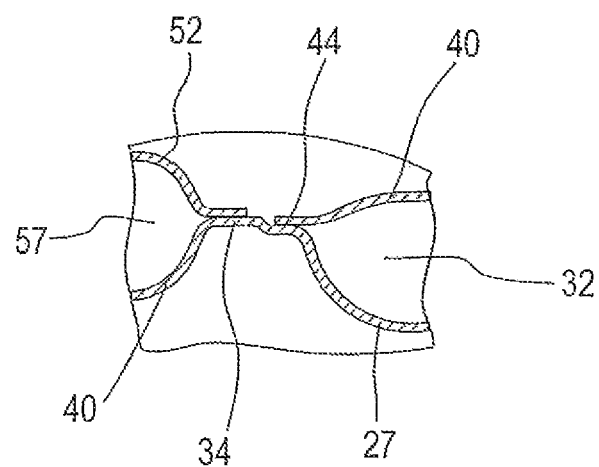
FIG. 6 is an enlarged cross sectional view taken along a line A-A in FIG. 1.
Figure 7A:
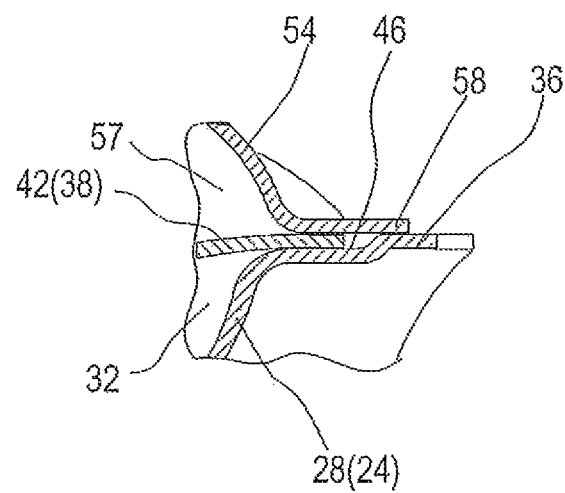
FIGS. 7A-7B are enlarged cross sectional views taken along a line B-B in FIG. 1.

The lower shell member 24 includes step portions 44, 46 corresponding to an outer periphery of the first upper shell member 38. As shown in FIG. 6 and FIG. 7A, the step portions 44, 46 are recessed downward from the flange portions 34, 36 in accordance with a plate thickness of the upper shell member 38. The recess may have a depth which is, for example, the same as the plate thickness of the upper shell member 38, or may have a depth appropriately adjusted based on the plate thickness.

The step portion 44 is formed between the first lower branch pipe part 26 and the second lower branch pipe part 27. The other step portion 46 is formed between the third lower branch pipe part 28 and the fourth lower branch pipe part 29. When the flat portion 42 of the first upper shell member 38 is superposed on both the step portions 44, 46, the upper side of the first flow passage 32 is covered with the first upper shell member 38.

The lower shell member 24 includes a flat flange portion 48 formed in a region between the second lower branch pipe part 27 and the third lower branch pipe part 28. When the first upper shell member 38 is superposed on the lower shell member 24, the flange portion 48 and the flat portion 42 of the first upper shell member 38 are closely attached to each other.

Joining of the lower shell member 24 and the first upper shell member 38 is achieved by performing welding in a state where the flat portion 42 of the first upper shell member 38 is superposed on the step portions 44, 46 and the flange portion 48 of the lower shell member 24.

The second upper shell member 50 is superposed on the lower shell member 24 and the first upper shell member 38 so as to cover the first lower branch pipe part 26 and the fourth lower branch pipe part 29.

The second upper shell member 50 includes a first upper branch pipe part 52, which is formed to be convex so as to have a semicircular, semielliptical, or the like cross-section toward an opposite side (hereinafter, also referred to simply as an "upside" with respect to the second upper shell member 50) to the lower shell member 24, corresponding to the first lower branch pipe part 26. The second upper shell member 50 also includes a fourth upper branch pipe part 54, which is formed to be convex so as to have a semicircular, semielliptical, or the like cross-section toward the upside, corresponding to the fourth lower branch pipe part 29.

The first upper branch pipe part 52 and the fourth upper branch pipe part 54 extend toward the converter 6 along the first lower branch pipe part 26 and the fourth lower branch pipe part 29, respectively. The first upper branch pipe part 52 and the fourth upper branch pipe part 54 are merged over the flat portion 42 of the first upper shell member 38 and communicate with an upper collecting pipe part 56. Accordingly, a planar shape of the second upper shell member 50 is substantially a "Y"-shape. The upper collecting pipe part 56 is an end portion on the converter 6 side of the second upper shell member 50, and is convex to have a semicircular, semielliptical, or the like cross section.

When the second upper shell member 50 is superposed on the lower shell member 24, the first lower branch pipe part 26 and the first upper branch pipe part 52 fit each other, while the fourth lower branch pipe part 29 and the fourth upper branch pipe part 54 fit each other. In this state, end portions of the first lower branch pipe part 26 and the first upper branch pipe part 52 located opposite to the lower collecting pipe part 30 are formed to be fittable in the through hole 10 of the flange 2, while end portions of the fourth lower branch pipe part 29 and the fourth upper branch pipe part 54 are formed to be fittable in the through hole 13 of the flange 2.

When the second upper shell member 50 is superposed on the lower shell member 24 as described above, a second flow passage 57 from the first upper branch pipe part 52 and the fourth upper branch pipe part 54 to the upper collecting pipe part 56 is formed. The second flow passage 57 includes, on a flange 2 side thereof as an upstream side, a flow path formed by being surrounded by the first lower branch pipe part 26 and the first upper branch pipe part 52, and a flow path formed by being surrounded by the fourth lower branch pipe part 29 and the fourth upper branch pipe part 54. These flow paths are merged on a downstream side thereof.

In a vicinity of a merging point on the downstream side, the flat portion 42 of the first upper shell member 38, in place of the lower shell member 24, forms a part of a flow path surrounded by the first lower branch pipe part 26, the fourth lower branch pipe part 29, and the upper collecting pipe part 56.

The upper collecting pipe part 56 is configured to correspond to the lower collecting pipe part 30 of the lower shell member 24. When the upper collecting pipe part 56 and the lower collecting pipe part 30 are assembled, a substantially elliptical shape is formed. Also, the flat portion 42 of the first upper shell member 38 is located between the upper collecting pipe part 56 and the lower collecting pipe part 30. In this state, the upper collecting pipe part 56 and the lower collecting pipe part 30 are formed to be fittable in an inlet pipe part 6a of the converter 6.

At an outer periphery of the second upper shell member 50, a flange portion 58 is formed except in regions to be fit in the through holes 10, 13 of the flange 2 and in the inlet pipe part 6a of the converter 6. When the second upper shell member 50 is superposed over the lower shell member 24 and the first upper shell member 38, the flange portion 58 of the second upper shell member 50 is closely attached to the flange portions 34, 36 of the lower shell member 24 and the flat portion 42 of the first upper shell member 38.

As a result, the upper branch pipe part 52 and the fourth upper branch pipe part 54 are superposed on the first lower branch pipe part 26 and the fourth lower branch pipe part 29, and a downside of the second upper shell member 50 is closed up by the flat portion 42 of the first upper shell member 38, to thereby form a second flow passage 57.

In the present embodiment, an end of the flat portion 42 of the first upper shell member 38 is formed to so as to reach ends of the lower collecting pipe part 30 of the lower shell member 24 and the upper collecting pipe part 56 of the second upper shell member 50. The end of the flat portion 42 may be formed to extend to a position not reaching the ends of the lower collecting pipe part 30 and the upper collecting pipe part 56 such that the first flow passage 32 and the second flow passage 57 are collected inside the lower collecting pipe part 30 and the upper collecting pipe part 56.

Joining of the lower shell member 24 and the second upper shell member 50 is achieved by welding the flange portion 58 of the second upper shell member 50 and each of the flange portions 34, 36, 42 of the lower shell member 24 in a state where these members are superposed on one another.

In this case, there are some three-layer regions in which the first upper shell member 38 is sandwiched between the lower shell member 24 and the second upper shell member 50. As shown in FIG. 7A, welding may be performed while the flat portion 42 of the first upper shell member 38 is superposed on the step portion 46 in the flange portion 36 of the lower shell member 24, and the flange portion 58 of the second upper shell member 50 is superposed on the flange portion 36 of the lower shell member 24. Although FIG. 7A shows only a side of the flange portion 36 and the step portion 46, the same operation may be performed on a side of the flange portion 34 and the step portion 44.

Figure 7B:
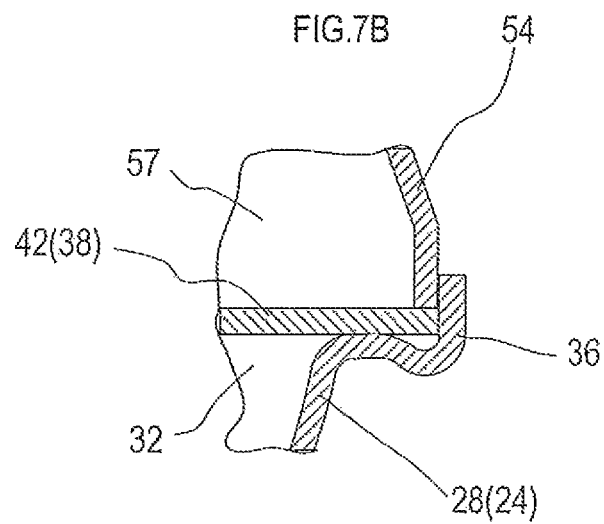

Alternatively, the flange portion 58 needs not be provided to the second upper shell member 50. In this case, as shown for example in FIG. 7B, the flat portion 42 of the first upper shell member 38 is superposed on the lower shell member 24, and the fourth upper branch pipe part 54 of the second upper shell member 50 is superposed on the flat portion 42. Then, it may be such that the flange portion 36 of the lower shell member 24 is bent upward, and welding of these members is performed. Alternatively, the flange portion 36 of the lower shell member 24 may be bent upward in advance. Although FIG. 7B shows only a side of the flange portion 36 and the fourth upper branch pipe part 54, the same operation may be performed on a side of the flange portion 34 and the upper branch pipe part 52.

When the shell member 4, including the lower shell member 24, the first upper shell member 38, and the second upper shell member 50, is fit in the through holes 10-13 of the flange 2, and welding along peripheries thereof is performed, the flange 2 and the shell member 4 are joined together. Also, when the inlet pipe part 6a of the converter 6 is fit in the upper collecting pipe part 56 and the lower collecting pipe part 30, and welding along peripheries thereof is performed, the shell member 4 and the converter 6 are joined together.

Next, a description will be provided on flow of exhaust gases in the exhaust manifold in the aforementioned present embodiment.

Exhaust gases by combustion in the first cylinder #1 flow from the first exhaust port P1 through the through hole 10 into the second flow passage 57 constituted by the first lower branch pipe part 26 and the first upper branch pipe part 52. Subsequently, the exhaust gases flow through the second flow passage 57 between the flat portion 42 and the first upper branch pipe part 52, and through the second flow passage 57 between the flat portion 42 and the upper collecting pipe part 56. Then the exhaust gases are conveyed to the converter 6, and to a not-shown exhaust pipe located on a downstream side from the converter 6.

Exhaust gases by combustion in the third cylinder #3 flow from the third exhaust port P3 through the through hole 12 into the first flow passage 32 constituted by the third lower branch pipe part 28 and the third upper branch pipe part 41. Subsequently, the exhaust gases flow through the first flow passage 32 between the flat portion 42 and the third lower branch pipe part 28, and through the first flow passage 32 between the flat portion 42 and the lower collecting pipe part 30. Then, the exhaust gases are conveyed to the converter 6, and to the not-shown exhaust pipe located on the downstream side from the converter 6.

Next, exhaust gases by combustion in the fourth cylinder #4 flow from the fourth exhaust port P4 through the through hole 13 into the second flow passage 57 constituted by the fourth lower branch pipe part 29 and the fourth upper branch pipe part 54. Subsequently, the exhaust gases flow through the second flow passage 57 between the flat portion 42 and the fourth upper branch pipe part 54, and through the second flow passage 57 between the flat portion 42 and the upper collecting pipe part 56. Then, the exhaust gases are conveyed to the converter 6, and to the not-shown exhaust pipe located on the downstream side from the converter 6.

Combustion in the third cylinder #3 is followed by combustion in the fourth cylinder #4, exhaustion from the third exhaust port P3 and exhaustion from the fourth exhaust port P4 are in a sequential order, and the third exhaust port P3 and the fourth exhaust port P4 are adjacent to each other. However, since exhaust gases from the third exhaust port P3 pass through the first flow passage 32 between the flat portion 42 and the third lower branch pipe part 28, and the first flow passage 32 between the flat portion 42 and the lower collecting pipe part 30, influence on exhaust gases flowing from the fourth exhaust port P4 and passing through the second flow passage 57 is small, and interference in exhaust gases is suppressed.

Exhaust gases by combustion in the second cylinder #2 flow from the second exhaust port P2 through the through hole 11 into the first flow passage 32 constituted by the second lower branch pipe part 27 and the second upper branch pipe part 40. Subsequently, the exhaust gases flow from the first flow passage 32 between the flat portion 42 and the second lower branch pipe part 27 through the first flow passage 32 between the flat portion 42 and the lower collecting pipe part 30. Then, the exhaust gases are conveyed to the converter 6, and to the not-shown exhaust pipe located on the downstream side from the converter 6.

Exhaustion from the second exhaust port P2 and exhaustion from the first exhaust port P1 are in a sequential order, and the second exhaust port P2 and the first exhaust port P1 are adjacent to each other. However, since exhaust gases from the second exhaust port P2 pass through the first flow passage 32 between the flat portion 42 and the second lower branch pipe part 27, and the first flow passage 32 between the flat portion 42 and the lower collecting pipe part 30, influence on exhaust gases flowing from the first exhaust port P1 and passing through the second flow passage 57 is small, and interference in exhaust gases is suppressed.

As described above, in the exhaust manifold 1 of the present embodiment, the first upper shell member 38 is superposed on the lower shell member 24 and the second upper shell member 50 is further superposed thereon. This allows welding from a same direction, and thus leads to an improved productivity. The first upper shell member 38 is only required to form the first flow passage 32 to be connected to one of groups of exhaust ports, and thus can be compact in size. Also, since interference in exhaust gases is suppressed even when the first upper shell member 38 is compact in size, the heat capacity of the exhaust manifold 1 can be reduced. Then, a temperature of exhaust gases passing through the exhaust manifold 1 is recovered in a short time and a temperature decrease of the exhaust gases is suppressed, which leads to an improved exhaust gas purifying efficiency.

The configuration, in which the second upper shell member 50 is superposed on the lower shell member 24 with the first upper shell member 38 sandwiched therebetween, to thereby separate the first flow passage 32 and the second flow passage 57, may lead to reduction in size of the flat portion 42 of the first upper shell member 38, and thus high rigidity. That is advantageous against vibration, allows use of a thinner wall, and is advantageous for early activation of the catalyst. Also, forming the step portions 44, 46 corresponding to the outer periphery of the first upper shell member 38 in the lower shell member 24 and superposing the first upper shell member 38 on the step portions 44, 46 enable the following: easy assembly operation can be achieved and thus productivity can be improved, increase in exhaust resistance of exhaust gases passing through the second flow passage 57 can be suppressed, and pressure loss can be suppressed. Further, when the first upper shell member 38 is formed to downstream ends of the second upper shell member 50 and the lower shell member 24, interference in exhaust gases can be more surely suppressed.

The configuration of the lower shell member 24, the first upper shell member 38, and the second upper shell member 50 may be designed upside down so that these members are turned over when being welded.

The present invention should not at all be limited to the above described embodiment, but may be practiced in various forms without departing from the gist of the present invention.

What is claimed is:

1. An exhaust manifold to be connected to an internal combustion engine with a plurality of exhaust ports, the exhaust manifold comprising:
   a first upper shell member;
   a second upper shell member, the first and the second upper shell members comprising a plurality of upper branch pipe parts; and
   a lower shell member comprising a plurality of lower branch pipe parts, each one configured to be coupled to a corresponding one of the plurality of upper branch pipe parts such that each of the plurality of lower branch pipe parts and upper branch pipe parts together form one of a plurality of flow passages;
   each of the first upper shell member, the second upper shell member, and the lower shell member being formed by press molding a plate material, wherein the first upper shell member and the lower shell member are superposed on each other, to thereby form a first flow passage to be connected to at least one exhaust port out of the plurality of exhaust ports, and wherein the second upper shell member is superposed on the lower shell member with the first upper shell member sandwiched therebetween such that at least a part of the first upper shell member that forms the first flow passage is exposed, to thereby form a second flow passage to be connected to another at least one exhaust port out of the plurality of exhaust ports.

2. The exhaust manifold according to claim 1,
wherein the first upper shell member is formed to downstream ends of the second upper shell member and the lower shell member.

3. The exhaust manifold according to claim 1,
wherein the lower shell member includes a step portion corresponding to an outer periphery of the first upper shell member, and the first upper shell member is superposed on the step portion.

4. The exhaust manifold according to claim 3,
wherein the first upper shell member is formed to downstream ends of the second upper shell member and the lower shell member.

5. The exhaust manifold according to claim 3,
wherein the step portion is configured to be recessed toward an opposite side to a side of the lower shell member on which the first upper shell member is superposed.

6. The exhaust manifold according to claim 5,
wherein the first upper shell member is formed to downstream ends of the second upper shell member and the lower shell member.

7. The exhaust manifold according to claim 1,
wherein the second upper shell member and the lower shell member are superposed on each other with the first upper shell member sandwiched therebetween, to thereby separate the first flow passage and the second flow passage.

8. The exhaust manifold according to claim 7,
wherein the first upper shell member is formed to downstream ends of the second upper shell member and the lower shell member.

9. The exhaust manifold according to claim 7,
wherein the lower shell member includes a step portion corresponding to an outer periphery of the first upper shell member, and the first upper shell member is superposed on the step portion.

10. The exhaust manifold according to claim 9,
wherein the first upper shell member is formed to downstream ends of the second upper shell member and the lower shell member.

11. The exhaust manifold according to claim 9,
wherein the step portion is configured to be recessed toward an opposite side to a side of the lower shell member on which the first upper shell member is superposed.

12. The exhaust manifold according to claim 11,
wherein the first upper shell member is formed to downstream ends of the second upper shell member and the lower shell member.

13. The exhaust manifold according to claim 1,
wherein the plurality of exhaust ports include at least four exhaust ports,
the first flow passage is connected to each exhaust port in a first group of exhaust ports, which include at least two exhaust ports having a mutually non-sequential order of exhaustion, among the at least four exhaust ports, and the second flow passage is connected to each exhaust port in a second group of exhaust ports, which include another at least two exhaust ports excluding the at least two exhaust ports included in the first group of exhaust ports and having a mutually non-sequential order of exhaustion, among the at least four exhaust ports.

14. The exhaust manifold according to claim 13,
wherein the first upper shell member is formed to downstream ends of the second upper shell member and the lower shell member.

15. The exhaust manifold according to claim 13,
wherein the lower shell member includes a step portion corresponding to an outer periphery of the first upper shell member, and the first upper shell member is superposed on the step portion.

16. The exhaust manifold according to claim 15,
wherein the first upper shell member is formed to downstream ends of the second upper shell member and the lower shell member.

17. The exhaust manifold according to claim 15,
wherein the step portion is configured to be recessed toward an opposite side to a side of the lower shell member on which the first upper shell member is superposed.

18. The exhaust manifold according to claim 17,
wherein the first upper shell member is formed to downstream ends of the second upper shell member and the lower shell member.

19. The exhaust manifold according to claim 13,
wherein the second upper shell member and the lower shell member are superposed on each other with the first upper shell member sandwiched therebetween, to thereby separate the first flow passage and the second flow passage.

20. The exhaust manifold according to claim 19,
wherein the first upper shell member is formed to downstream ends of the second upper shell member and the lower shell member.

21. The exhaust manifold according to claim 19,
wherein the lower shell member includes a step portion corresponding to an outer periphery of the first upper shell member, and the first upper shell member is superposed on the step portion.

22. The exhaust manifold according to claim 21,
wherein the first upper shell member is formed to downstream ends of the second upper shell member and the lower shell member.

23. The exhaust manifold according to claim 21,
wherein the step portion is configured to be recessed toward an opposite side to a side of the lower shell member on which the first upper shell member is superposed.

24. The exhaust manifold according to claim 23,
wherein the first upper shell member is formed to downstream ends of the second upper shell member and the lower shell member.

25. The exhaust manifold according to claim 13,
wherein the internal combustion engine includes, as the at least four exhaust ports, a first exhaust port, a second exhaust port, a third exhaust port, and a fourth exhaust port,
the first exhaust port is an exhaust port through which exhaustion is performed subsequent to the second exhaust port, the third exhaust port is an exhaust port through which exhaustion is performed subsequent to the first exhaust port, the fourth exhaust port is an exhaust port through which exhaustion is performed subsequent to the third exhaust port, the second exhaust port is an exhaust port through which exhaustion is performed subsequent to the fourth exhaust port, the first group of exhaust ports include the second exhaust port and the third exhaust port, and the second group of exhaust ports include the first exhaust port and the fourth exhaust port.

26. The exhaust manifold according to claim 25, wherein the first upper shell member is formed to downstream ends of the second upper shell member and the lower shell member.

27. The exhaust manifold according to claim 25, wherein the lower shell member includes a step portion corresponding to an outer periphery of the first upper shell member, and the first upper shell member is superposed on the step portion.

28. The exhaust manifold according to claim 27, wherein the first upper shell member is formed to downstream ends of the second upper shell member and the lower shell member.

29. The exhaust manifold according to claim 27, wherein the step portion is configured to be recessed toward an opposite side to a side of the lower shell member on which the first upper shell member is superposed.

30. The exhaust manifold according to claim 29, wherein the first upper shell member is formed to downstream ends of the second upper shell member and the lower shell member.

31. The exhaust manifold according to claim 25, wherein the second upper shell member and the lower shell member are superposed on each other with the first upper shell member sandwiched therebetween, to thereby separate the first flow passage and the second flow passage.

32. The exhaust manifold according to claim 31, wherein the first upper shell member is formed to downstream ends of the second upper shell member and the lower shell member.

33. The exhaust manifold according to claim 31, wherein the lower shell member includes a step portion corresponding to an outer periphery of the first upper shell member, and the first upper shell member is superposed on the step portion.

34. The exhaust manifold according to claim 33, wherein the first upper shell member is formed to downstream ends of the second upper shell member and the lower shell member.

35. The exhaust manifold according to claim 33, wherein the step portion is configured to be recessed toward an opposite side to a side of the lower shell member on which the first upper shell member is superposed.

36. The exhaust manifold according to claim 35, wherein the first upper shell member is formed to downstream ends of the second upper shell member and the lower shell member.

37. The exhaust manifold according to claim 25, wherein the first to fourth exhaust ports are formed in an order of the first exhaust port, the second exhaust port, the third exhaust port, and the fourth exhaust port, and an upstream side of the second flow passage is formed by the lower shell member and the second upper shell member, while a downstream side of the second flow passage is formed by the first upper shell member and the second upper shell member.

38. The exhaust manifold according to claim 37, wherein the first upper shell member is formed to downstream ends of the second upper shell member and the lower shell member.

39. The exhaust manifold according to claim 37, wherein the lower shell member includes a step portion corresponding to an outer periphery of the first upper shell member, and the first upper shell member is superposed on the step portion.

40. The exhaust manifold according to claim 39, wherein the first upper shell member is formed to downstream ends of the second upper shell member and the lower shell member.

41. The exhaust manifold according to claim 39, wherein the step portion is configured to be recessed toward an opposite side to a side of the lower shell member on which the first upper shell member is superposed.

42. The exhaust manifold according to claim 41, wherein the first upper shell member is formed to downstream ends of the second upper shell member and the lower shell member.

43. The exhaust manifold according to claim 37, wherein the second upper shell member and the lower shell member are superposed on each other with the first upper shell member sandwiched therebetween, to thereby separate the first flow passage and the second flow passage.

44. The exhaust manifold according to claim 43, wherein the first upper shell member is formed to downstream ends of the second upper shell member and the lower shell member.

45. The exhaust manifold according to claim 43, wherein the lower shell member includes a step portion corresponding to an outer periphery of the first upper shell member, and the first upper shell member is superposed on the step portion.

46. The exhaust manifold according to claim 45, wherein the first upper shell member is formed to downstream ends of the second upper shell member and the lower shell member.

47. The exhaust manifold according to claim 45, wherein the step portion is configured to be recessed toward an opposite side to a side of the lower shell member on which the first upper shell member is superposed.

48. The exhaust manifold according to claim 47, wherein the first upper shell member is formed to downstream ends of the second upper shell member and the lower shell member.

* * * * *